United States Patent
Mehta et al.

(10) Patent No.: US 9,255,022 B2
(45) Date of Patent: Feb. 9, 2016

(54) BIOLOGICAL-CHEMICAL TREATMENT OF LIQUID ORGANIC WASTEWATER

(71) Applicant: Infilco Degremont, Inc., Richmond, VA (US)

(72) Inventors: Sunil Mehta, Henrico, VA (US); Nabin Chowdhury, Glen Allen, VA (US); Richard Ubaldi, Glen Allen, VA (US); Barbara Schilling, West Orange, NJ (US); Antonio Lau, Richmond, VA (US); Bruno Heiniger, Boll (CH)

(73) Assignee: Infilco Degremont, Inc, Richmond, VA (US)

(*) Notice: Subject to any disclaimer, the term of this patent is extended or adjusted under 35 U.S.C. 154(b) by 0 days.

(21) Appl. No.: 13/757,030

(22) Filed: Feb. 1, 2013

(65) Prior Publication Data

US 2014/0217019 A1  Aug. 7, 2014

(51) Int. Cl.
| | |
|---|---|
| *C02F 9/00* | (2006.01) |
| *C02F 1/72* | (2006.01) |
| *C02F 1/78* | (2006.01) |
| *C02F 3/12* | (2006.01) |
| *C02F 3/30* | (2006.01) |

(52) U.S. Cl.
CPC . *C02F 9/00* (2013.01); *C02F 1/722* (2013.01); *C02F 1/78* (2013.01); *C02F 3/12* (2013.01); *C02F 3/302* (2013.01); *Y02W 10/15* (2015.05)

(58) Field of Classification Search
USPC .............. 210/620, 621, 623, 626, 627, 631, 210/758–760
See application file for complete search history.

(56) References Cited

U.S. PATENT DOCUMENTS

| | | | |
|---|---|---|---|
| 3,930,998 A | 1/1976 | Knopp et al. | |
| 4,178,239 A | 12/1979 | Lowther | |
| 5,302,288 A * | 4/1994 | Meidl et al. | 210/616 |
| 5,702,604 A | 12/1997 | Yamasaki et al. | |
| 6,398,959 B1 * | 6/2002 | Teran et al. | 210/609 |
| 6,770,470 B2 | 8/2004 | Lee | |
| 6,773,595 B2 | 8/2004 | Gantzer | |
| 7,713,417 B2 | 5/2010 | Sutton | |
| 7,820,047 B2 | 10/2010 | Yerushalmi et al. | |

(Continued)

OTHER PUBLICATIONS

International Search Report for International Application No. PCT/US2014/013663 filed Jan. 29, 2014; 2 pages.

(Continued)

*Primary Examiner* — Chester Barry
(74) *Attorney, Agent, or Firm* — Landmark Intellectual Property Law, PLLC

(57) ABSTRACT

The invention is directed to systems and methods of biological and chemical treatment of wastewater comprising organic nitrogen compounds. Systems may include: an aerobic reactor, a first separation module for separating liquid and solid components of the wastewater; an oxidation module for removing organic materials from the wastewater; and a post-anoxic reactor for denitrifying at least a portion of the wastewater. Systems may include a second separation module and various feedback recycle lines between the components. Methods may include: degrading by the aerobic reactor more than 95% of organic compounds to ammonia, oxidizing by the oxidation module at least a portion of the ammonia to nitrates, and degrading by the post-anoxic reactor at least a portion of the nitrates to nitrogen gas and water. Systems and methods may reduce total organic carbon of the wastewater by more than 90%, and total nitrogen of the wastewater by more than 90%.

25 Claims, 11 Drawing Sheets

(56) References Cited

U.S. PATENT DOCUMENTS

| | | | |
|---|---|---|---|
| 8,557,118 B2* | 10/2013 | Kain et al. | 210/616 |
| 2007/0251868 A1* | 11/2007 | Bailey et al. | 210/195.3 |
| 2013/0213883 A1* | 8/2013 | Josse et al. | 210/630 |

OTHER PUBLICATIONS

Lin, Han-Lin, et al., "Use of Two-Stage Biological Process in Treating Thin Film Transistor Liquid Crystral Display Wastewater of Tetramethylammonium Hydroxide" Sustain. Environ. Res., 21(3), 155-160 (2011).

Lei, C.N., et al., "Biological Treament of Thin-Film Transistor Liquid Crystal Display (TFT-LCD) Wastewater", Water Science & Tech., 53.5 (2008).

Lei, Chin-Nan, et al., "Biological Treatment of Thin-Film Transistor Liquid Crystal Display (TFT-LCD) Wastewater Using Aerobic and Anoxic/Oxic Sequencing Batch Reactors", Chemosphere 81, 57-64 (2010).

Whang, L.M., et al., "Microbial Ecology and Performance of Nitrifying Bacteria in an Aerobic Membrane Bioreactor Treating Thin-Film Transistor Liquid Crystal Display Wastewater", Water Science & Tech., 58.12 (2008).

Wu, Y.J, et al., "Evaluation of Performance and Microbial Ecology of Sequencing Batch Reactor and Membrane Bioreactor Treating Thin-Film Transistor Liquid Crystal Display Wastewater," Water Science & Tech. 58.5 (2008).

* cited by examiner

BIOLOGICAL-CHEMICAL TREATMENT OF LIQUID ORGANIC WASTEWATER

BACKGROUND OF THE INVENTION

In general, the present invention is directed to systems and methods of treating wastewater produced by the manufacturing processes used to produce electronic components. More specifically, the present invention is directed to systems and methods for removing various components, such as but not limited to, tetra-methyl ammonium hydroxide ($(CH_3)_4NOH$, TMAH) from wastewater generated by the manufacture of opto-electronic components, such as thin-film transistor liquid crystal displays (TFT-LCDs).

As manufacturing processes in the opto-electronic and semiconductor industries advance, the composition of wastewater generated by such processes has become more complex. For example, such wastewater may comprise both organic carbon compounds and organic nitrogenous compounds, which may be poisonous, corrosive, and eutrophic to the environment.

Thin film transistor liquid crystal displays are a type of LCD that uses thin-film transistor technology to provide an active matrix LCD. TFT-LCDs are used in a variety of consumer products, such as television sets, computer monitors, mobile telephones, navigation systems, etc.

The production of TFT-LCDs in particular, generates significant amounts of high-strength organic nitrogen containing wastewater. Such wastewater may comprise various contaminants, such as TMAH—used as a developer in the production of TFT-LCDs), monoethanolamine ($C_2H_5ONH_2$, MEA) and dimethyl suphoxide (($CH_3)_2SO$, DMSO)—used as a stripper in the production, as well as chelating agents. TMAH is often used as component of the positive photoresist developers in the photolithography process of TFT-LCD manufacturing. TMAH, MEA, and DMSO are generally seen as slow biodegradable organic compounds, which during degradation typically release ammonia, resulting in a high ammonia concentration and a potential nitrification in treated wastewater.

Historically, semiconductor and electronic component manufacturing plants discharged their wastewater to local publicly owned treatment works (POTW) systems. However, the increased loading due to the recent growth of the semiconductor industries coupled with more stringent discharge regulations imposed on POTW to remove organic and nitrogen compounds from wastewater limits the ability of any such POTW to treat adequately treat such discharge.

It has been shown in the prior art that various microorganisms are capable of degrading DMSO under certain conditions. For example, *Escherichi coli, Klebsiella, Serratia, Citrobacter braakii, Cyptococcus humicolus, Hyphomicrobium* species, and *Rhodobacter capsulatus* have shown positive results in degrading DMSO. Moreover, MEA can often be degraded through a wide variety of reactions common to amine and alcohol, and can be hydrated to ammonia and acetate. Degradation of TMAH has been particularly problematic, in that the presence of TMAH has an adverse and inhibitory impact on nitrification activity.

Very little prior art addresses the application of a biological nutrient removal process for treating such wastewater, and the prior art that makes such suggestions falls unacceptably short in terms of performance. For example, in a paper entitled Nitrification-Denitrification of Opto-electronic Industrial Wastewater by Anoxic/Aerobic Process, by Chen, et at and published in the Journal of Environmental Science and Health, Part A: Toxic/Hazardous Substances and Environmental Engineering, Vol. 38, Issue 10, (2003), reported a 92-98% COD removal from wastewater by using a two-stage anoxic-aerobic process, yet total nitrogen removal efficiencies were merely 70%. Moreover, as noted above, it has been recorded by several studies that the presence of TMAH inhibits biological processes. See, e.g., Use of Two-Stage Biological Process in Treating Thin Film Transistor Liquid Crystal Display Wastewater of Tetramethylammonium Hydroxide, by Han-Lin Lin, et al., and published in Sustainable Environment Research Journal, Volume 21(3), (2011); Biological Treatment of TMAH (tetra-methyl ammonium hydroxide) In a Full Scale TFT-LCD Wastewater Treatment Plant, by T H Hu, et al., and published in the Bioresource Technology Journal, (2012).

Accordingly, systems and methods for treating wastewater resulting from the production of TFT-LCDs that effectively remove TMAH as well as COD and total nitrogen are desired.

SUMMARY OF THE INVENTION

In accordance with some embodiments of the present invention, aspects may include a biological and chemical treatment system for treating wastewater comprising liquid and solid components, comprising: an aerobic reactor, receiving an influent comprising wastewater to be treated; a first separation module in series with the aerobic reactor, the first separation module receiving the output of the aerobic reactor as an input, the first separation module separating liquid and solid components of the wastewater; an oxidation module in series with the first separation module, the oxidation module receiving the output of the first separation module as an input, the oxidation module removing organic materials from the wastewater; and a post-anoxic reactor in series with the oxidation module, the post-anoxic reactor receiving the output of the oxidation module as an input, the post-anoxic reactor denitrifying at least a portion of the wastewater, and outputting an effluent.

Other aspects in accordance with some embodiments of the present invention, may include a biological and chemical treatment system for treating wastewater comprising liquid and solid components, comprising: an aerobic reactor, receiving an influent comprising wastewater to be treated; a membrane filtration system receiving the output of the aerobic reactor as an input, the membrane filtration system separating liquid and solid components of the wastewater; an oxidation module in series with the first separation module, the oxidation module receiving the output of the first separation module as an input, the oxidation module removing organic materials and nitrifying ammonia from the wastewater; a post-anoxic reactor in series with the oxidation module, the post-anoxic reactor receiving the output of the oxidation module as an input, the post-anoxic reactor denitrifying at least a portion of the wastewater, and outputting an effluent; and a gravity clarifier for sludge separation receiving the output of the post-anoxic reactor as an input.

Other aspects in accordance with some embodiments of the present invention may include a biological and chemical treatment method for treating wastewater comprising liquid and solid components as well as organic nitrogen compounds, comprising: receiving an influent comprising wastewater to be treated in an aerobic reactor, biologically treating the influent to convert and degrade organic nitrogen compounds; receiving at a first separation module from the aerobic reactor an output of the aerobic reactor; separating liquid and solid components of the wastewater by the first separation module; receiving at an oxidation module from the first separation module an output of the first separation module; removing organic materials and nitrifying ammonia from the wastewater by the oxidation module; receiving at a post-anoxic reactor from the oxidation module an output of the oxidation module; and denitrifying at least a portion of the wastewater by the post-anoxic reactor, and outputting an effluent.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
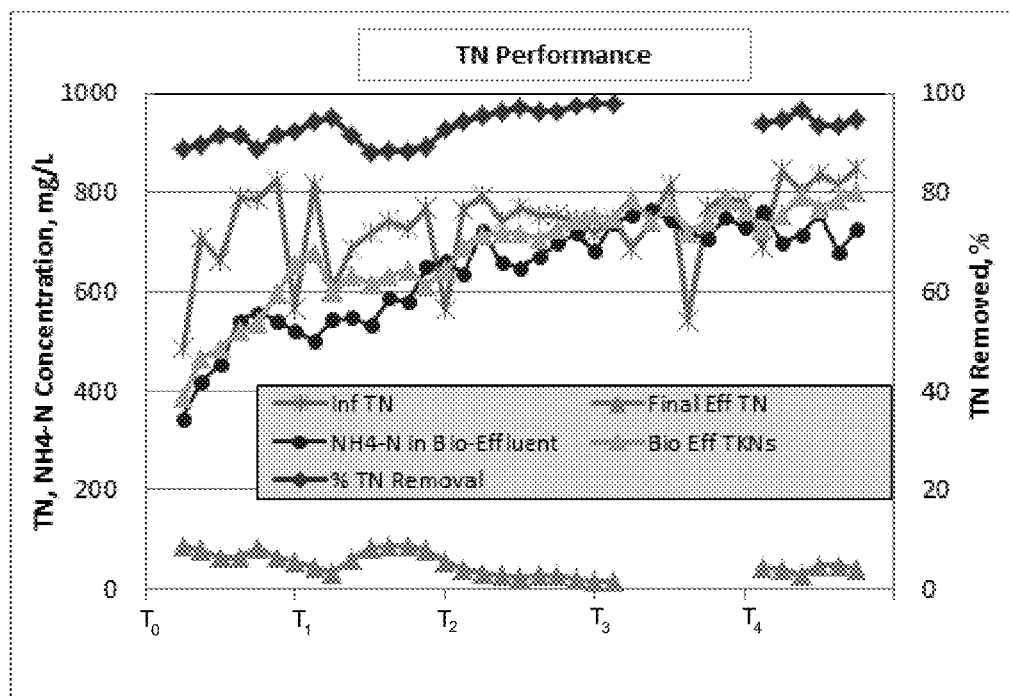
FIG. 1 illustrates exemplary system performance results for systems and methods of treating wastewater, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In order to determine the efficacy of the systems and methods discussed herein, two (2) types of industrial waste streams were tested: a liquid organic waste (LOW) stream, and a stream comprising TMAH. The TMAH stream was treated in by an aerobic-AOP-anoxic system, while the LOW stream was treated using an anoxic-aerobic-AOP-anoxic system. Each will be discussed in turn.

Treatment of TMAH Stream

The systems and methods discussed herein have been tested, both through theoretical calculations and through experimentation. It has been found that by using systems and methods in accordance with some embodiments of the present invention, a combination of aerobic treatment of wastewater, coupled with an advanced oxidation process (AOP) as well as biological denitrification, efficiencies of at or around 96.3% of total nitrogen removal can be obtained.

In general, the TMAH stream was treated using an activated sludge process configured with aerobic and anoxic bioreactors and AOP within the treatment loop. The TMAH stream was diluted at 1:6 with distilled water to avoid chemical toxicity to the biological process. As is discussed in detail below, the aerobic-AOP-anoxic system efficiently removed >98% TOC and >95% TN. Moreover, the effluent showed complete, or substantially complete degradation of TMAH in the aerobic bioreactor. Even though the influent had a TMAH concentration of 4,000 mg/L, no toxicity and/or inhibition of the biological treatment was observed over the experimental duration.

Specifically, through the use of systems and methods in accordance with some embodiments of the present invention, greater than 99% of TMAH was converted to ammonia, thereby generating a free $NH_4$—N for further conversion. AOP ozonation of biologically treated wastewater then completed the oxidation of ammonia into nitrates ($NO_3$—N), and post-anoxic biological denitritifaction of the effluent from the AOP resulted in complete and substantially complete conversion of the nitrates into nitrogen gas.

FIG. 1 and Table 1 set forth specific exemplary results.

TABLE 1

Overall Treatment System Performance Results

|  | Influent | Aerobic | AOP | Anoxic | Effluent | Removal |
|---|---|---|---|---|---|---|
| TOC (mg/L) | 2800 ± 120 | 80 ± 20 | <30 | — | — | >98% |
| $NH_4$—N (mg/L) | 7 ± 1 | 690 ± 30 | 8 ± 2 | — | 6 ± 3 | — |
| $NO_3$—N (mg/L) | <0.4 | <0.4 | 610 ± 30 | <0.4 | <0.4 | — |
| $NO_2$—N (mg/L) | <0.5 | <0.5 | <0.5 | <0.5 | <0.5 | — |
| TKN (mg/L) | 750 ± 30 | 715 ± 25 | 30 ± 5 | — | 26 ± 5 | >95% |
| TMAH (mg/L) | 4000 | — | — | — | — | >99% |

In order to best understand the application and results of the systems and methods embodied in the present invention, it may first be useful to understand the characteristics of the wastewater to be treated by such systems and methods. Industrial wastewaters, as set forth in Table 2, the Liquid Organic Wastes (LOW) stream and TMAH stream were collected from a semiconductor manufacturer in USA.

TABLE 2

Wastewater Characteristics

| Parameter | LOW stream | TMAH stream |
|---|---|---|
| pH | >12 | >12 |
| Conductivity (mS/cm) |  | 75 |
| TMAH (mg/L) | 45,000-50,000 | 20,000-25,000 |
| TOC (mg/L) | 75,000-80,000 | 15,000-20,000 |
| Total Nitrogen (mg/L) | 9,500-10,000 | 4,500-5,000 |
| COD (mg/L) | 170,000-190,000 | No test method available |

Systems in accordance with some embodiments of the present invention may comprise a two-zone treatment system, in which following an equalization step, the wastewater may be conditioned with various chemicals for proper biological degradation. The wastewater may then be processed through (i) an anoxic selector reactor; (ii) an aerobic activated sludge reactor; (iii) an ultrafiltration (UF) membrane for sludge separation; (iv) an anoxic post-denitrification reactor; and (v) a clarifier for sludge separation. In addition, an AOP process may be utilized to treat organics and nitrification of the wastewater.

During experimentation, in order to address higher TN and TMAH loadings wastewater dilution rations of 1:6 and 1:3 were tested through a process comprising aerobic, clarification, AOP, and post-anoxic denitrification. Specifically, an aerobic activated sludge reactor was used to degrade TMAH and generate $NH_4$—N, membrane filtration to separate the sludge, an AOP system to convert $NH_4$—N into $NO_3$—N, an anoxic reactor to convert $NO_3$—N into $N_2$ gas, and a gravity clarifier for sludge separation.

Design loadings for the systems employing these strategies are set forth in Table 3.

TABLE 3

Pilot Unit Design Loadings

|  | LOW stream | TMAH stream |
|---|---|---|
| COD loading | 2.4-2.7 (kg COD/$m^3$/d) | Not measureable |
| TOC loading | 1.2-1.4 (kg TOC/$m^3$/d) | 0.53-0.75 (kg TOC/$m^3$/d) |
| TN loading | 0.14-0.16 (kg TN/$m^3$/d) | 0.13-0.21 (kg TN/$m^3$/d) |

TABLE 3-continued

Pilot Unit Design Loadings

|  | LOW stream | TMAH stream |
|---|---|---|
| TMAH loading | 0.7-0.8 (kg TMAH/$m^3$/d) | 0.9-1.1 (kg TMAH/$m^3$/d) |

In order to understand the systems and methods of the present invention, as well as the exemplary results set forth herein, several components of the test protocol will be discussed below in detail. Specifically, each of (i) wastewater characterization; (ii) aerobic biological treatment for TMAH breakdown into ammonia; (iii) advanced oxidation of ammonia to nitrate; (iv) combined biological and advanced oxidation for TN removal; and (v) any potential impact of pH values on TMAH decomposition and degradation, are discussed below.

Wastewater Characterization

The wastewater to be treated was analyzed for main chemical constituents, organic content parameters (COD, TOC), nitrogen containing species (ammonia, nitrite, nitrate, organic nitrogen) and pH. The major chemical constituent found in wastewater was tetramethylammonium hydroxide (TMAH). Analytical results confirmed the presence of approximately 23,000 mg/L of TMAH, 17,561 mg/L of TOC and 4,675 mg/L of TKN.

Table 4 sets forth TOC and TKN analytical values for the wastewater comprising a TMAH solution.

TABLE 4

TOC and TKN Analytical Values for TMAH Solutions

| TMAH (mg/L) | COD (mg/L) | | TOC (mg/L) | | TKN (mg/L) | |
|---|---|---|---|---|---|---|
| | Theoretical | Experimental | Theoretical | Experimental | Theoretical | Experimental |
| 100 | 211 | <20 | 53 | 59 | 16 | 17 |
| 200 | 421 | <20 | 105 | 118 | 31 | 33 |
| 300 | 632 | <20 | 158 | 172 | 47 | 45 |
| 400 | 843 | <20 | 211 | 233 | 63 | 64 |
| 500 | 1053 | <20 | 264 | 283 | 78 | 84 |

Figure 2:
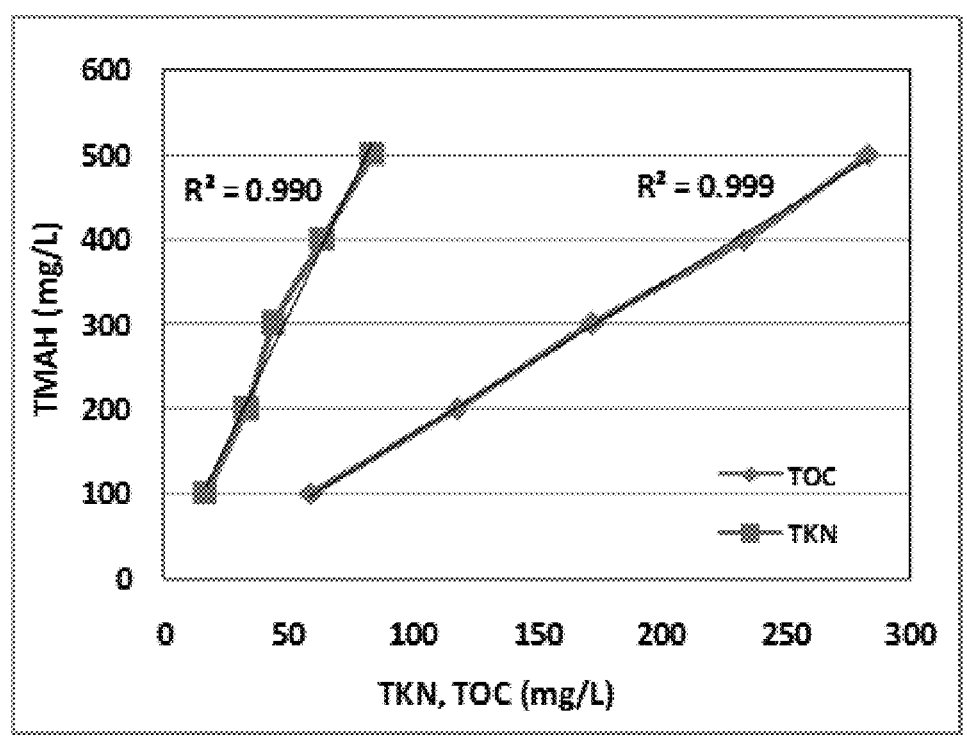
FIG. 2 illustrates an exemplary TMAH correlation with total Kjehldahl nitrogen (TKN) and total organic carbon (TOC), in accordance with some embodiments of the present invention.
Figure 3:
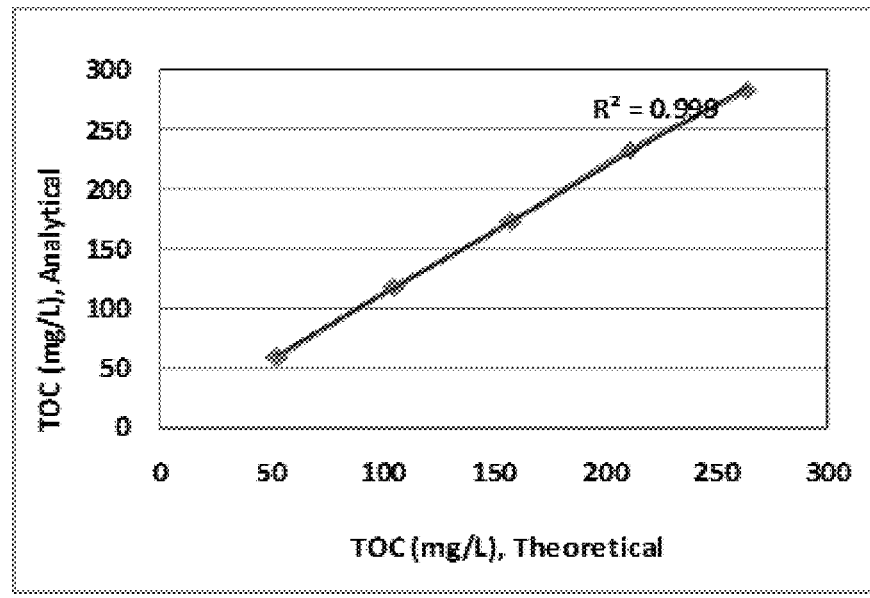
FIG. 3 illustrates an exemplary relationship between calculated theoretical results and experimental results for TOC in a TMAH solution, in accordance with some embodiments of the present invention.
Figure 4:
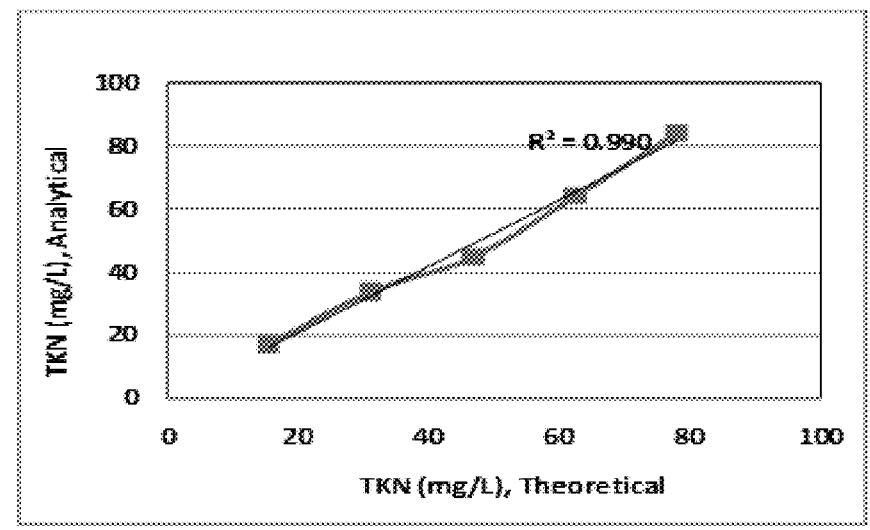
FIG. 4 illustrates an exemplary relationship between calculated theoretical results and experimental results for TKN in a TMAH solution, in accordance with some embodiments of the present invention.

In order to monitor TMAH from TOC and TN, correlations between TMAH and TOC, and TMAH and TN were developed. Specifically, TMAH standard solutions of 100, 200, 300, 400 and 500 mg/L were prepared using a stock solution of 25% TMAH. FIGS. 2, 3 and 4 show theoretical and experimental correlations for TOC and TKN concentrations in a TMAH solution.

In these analytical tests, the Total Kjeldahl Nitrogen (TKN) test method was used to determine the Total Nitrogen (TN=TKN+NOx-N) content of the solution since there was no NOx-N in wastewater treated. Thus, the Total Nitrogen concentration is equivalent to the TKN value for this sample.

The high regression coefficient ($R^2$=0.99) between theoretical and experimental TOC and TKN values indicates that the ratio of TOC to TMAH and TKN to TMAH can be properly used. From these correlations, the TOC content of TMAH is 0.5267 g TOC/g TMAH and the Total N content in TMAH is 0.1536 g N/g TMAH. These ratios can be used to estimate the influent and effluent TMAH concentration.

Figure 5:
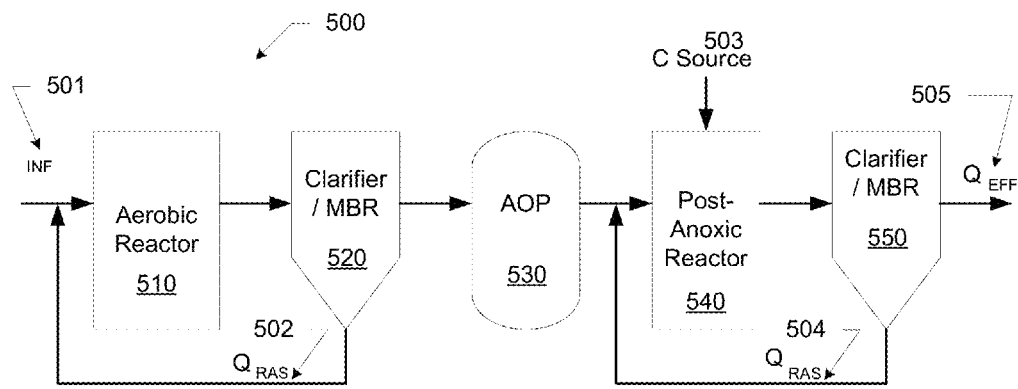
FIG. 5 depicts a system for treating wastewater, in accordance with some embodiments of the present invention.

With reference to FIG. 5, a system 50 of treating wastewater in accordance with some embodiments of the present invention will now be discussed. FIG. 5 depicts a system in accordance with Strategy 1, comprising an aerobic reactor 510, a first clarifier/membrane bioreactor (MBR) 520, an AOP system 530, a post-anoxic reactor 540, and a second clarifier/MBR 550.

In general, the aerobic reactor 510 may convert organic compounds into carbon dioxide, and degrade organic nitrogen (such as TMAH) into ammonia. Since the aerobic reactor 510 may be a biological reactor, the reaction may be summarized as:

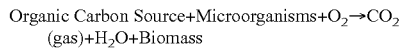

In the case of TMAH, the degradation may be summarized as:

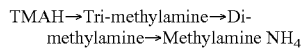

Or more specifically as:

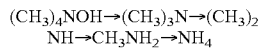

As noted, the aerobic reactor 510 may be a biological reactor that may convert and degrade the TMAH (i.e., organic nitrogen) into ammonia ($NH_4$—N). In the aerobic reactor 510, approximately 99% of TMAH may be degraded into ammonia, and 95% of TOC may be removed. The treated effluent from the aerobic reactor 510 may be then be fed into the first clarifier/MBR 520.

The first clarifier/MBR 520 may be a membrane filtration unit using, for example, a flat-sheet Toray UF membrane, or may be a conventional clarifier, such as for example, a settling type intermediate clarifier, where the clarifier underflow solids are recycled to the aerobic reactor 510 by lines 502 as return activated sludge (RAS) or sent to a sludge holding tank (not shown) as waste activated sludge (WAS). In the case of a membrane filtration unit, other than settling tanks and further filtration, the MBR process may utilize specialized membranes to employ ultrafiltration (UF) and micro-filtration (MF) membranes. MBR technology is commonly submerged into the bioreactor. Such a submerged configuration may rely on aeration to produce mixing and limit fouling. Aeration maintains solids in suspension, scours the membrane surface and provides oxygen to the biomass, leading to better degradability.

The AOP system 530 may be utilized to convert ammonia ($NH_4$—N) into nitrates ($NO_3$—N), as well as the treatment of recalcitrant organic compounds. The AOP system 530 may use ozone ($O_3$) and hydrogen peroxide ($H_2O_2$) for the chemical oxidation of ammonia to nitrate and COD destruction by causing oxidation of most organic compounds until they are fully mineralized as carbon dioxide, thereby removing excess carbon.

Specifically:

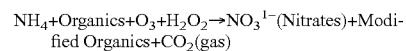

The AOP system 530 may comprise an aqueous phase oxidation method, comprising highly reactive species used in the oxidative destruction of the ammonia in the fluid. As noted, the AOP system 530 may use ozone ($O_3$) for treatment; alternatively, the AOP system 530 may use hydroxyl radicals, a powerful secondary oxidant.

While an AOP system 530 is shown, it is also contemplated by the present invention that other methods of removing ammonia from aqueous phase may be available. For example, as discussed in more detail below, a variety of methods, such as ammonia stripping may be utilized to remove ammonia from the aqueous phase. While advanced oxidation processes are discussed, it is fully contemplated by the present invention that alternatives processes may be utilized. For example, ammonia stripping, which is relatively known in the art may be utilized. Ammonia stripping may include the addition of dilute sulfuric acid in order to recover the ammonia as ammonium sulfate, a well-known fertilizer. Other alternatives may include breakpoint chlorination, a catalytic oxidation method, and/or selective ion exchange on clinoptilolite. Regardless of the specific system selected, the primary contribution of the system is the removal of ammonia. Moreover, note that if physical footprint is not an issue, ammonia may also be biologically removed.

The post-anoxic reactor 540 may provide an anoxic stage, where nitrates are reduced to nitrogen gas via denitrification reactions. Specifically:

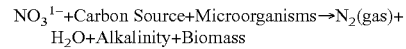

As wastewater may be deficient in macronutrients required to support biological growth, the post-anoxic reactor 540 may be fed with a biodegradable nutrient blend, containing macro- and micronutrients to maintain microbial growth. Nutrients include but are not limited to supplemental carbon such as waste sugar, corn syrup, molasses or the like, or the use of commercially available carbon sources, such as MicroC (available from Environmental Operating Solutions, Inc., in Bourne, Mass.) or D-Glucose (dextrose).

From the post-anoxic reactor 540, the fluid may flow into the second clarifier/MBR 550, where again, clarifier underflow solids may be recycled to as an influent of the post-anoxic reactor 540 by lines 504 as return activated sludge (RAS) or sent to a sludge holding tank (not shown) as waste activated sludge (WAS).

The system 50 depicted in FIG. 5 may comprise various reactors of various sizes. For experimental purposes, the aerobic reactor 510 utilized had a volume of 27 liters, the first clarifier/MBR 520 a volume of 15 liters, the AOP system 530 a volume of 16-25 liters, the post-anoxic reactor a volume of 4 liters, and the second clarifier/MBR a volume of 0.7 liters. Note however, that while the sizes and volumes of each system 50 component impact the overall efficiency and operation of the system 50, it is fully contemplated that various sizes of each component may be utilized without deviating from the invention.

The system 50 received influent $Q_{inf}$ at 501 at a rate of approximately 0.84 liters/day of wastewater, coupled with 4.2 liters/day of dilution water, resulting in a total influent of 5.04 liters/day. Note again, that such feed rates are exemplary only, and it is contemplated that substantially different feed rates may be utilized without deviating from the invention.

Other exemplary operating attributes of the system 50 may comprise a dilution water to wastewater ration of 5:1, a dilution factor of 6:1, an operating temperature maintained approximately 62-73° Fahrenheit, a mixed liquor volatile suspended solids (MLVSS) of approximately 6,375 mg/liter (+/− approximately 676 mg/liter), and a mixed liquor suspended solids (MLSS) of approximately 7,075 mg/liter (+/− approximately 701 mg/liter).

With continued reference to FIG. 5, the influent 501 may flow into the aerobic reactor 510, and then into the first clarifier/MBR 520. At this point, some return activated sludge flow 502 may be returned as an influent into the aerobic reactor 510. The influent may then travel into the AOP 530, and subsequently into the post-anoxic reactor 540. The post-anoxic reactor 540 may also receive an input of carbon source 503, discussed in more detail below. From the post-anoxic reactor 540 the fluid may then flow into the second clarifier/MBR 550, from which some return activated sludge flow 504 may be returned as an influent into the post-anoxic reactor 540. Effluent 505 may then exit the second clarifier/MBR 550.

Table 5 below illustrates loadings and operational parameters for system 50 at a 1:6 dilution utilizing Strategy 1.

Aerobic Reactor Operational Conditions and Results

During use, the aerobic reactor utilized in systems and methods in accordance with some embodiments of the present invention utilized stabilization and acclimation period of approximately two (2) weeks. After approximately one (1) week of operation, most of the TMAH was being converted into ammonia ($NH_4$—H). As shown below in Table 6, 98.5% of the TN in the effluent was in ammonia form. Accordingly, TMAH was successfully degraded into ammonia in the aerobic reactor.

TABLE 6

Degradation of TMAH in Ammonia

| Date/Time | Aerobic Influent $NH_4$ (mg/L) | Aerobic Influent TMAH (mg/L) | Aerobic Effluent $NH_4$ (mg/L) | Aerobic Effluent $NO_X$ (mg/L) | Aerobic Effluent TMAH (mg/L) |
|---|---|---|---|---|---|
| Day 1 | 10.7 | 3740 | 650 | <0.4 | 195 |
| Day 2 | 10.3 | 3644 | 662 | <0.4 | 0 |
| Day 3 | 10.1 | 3719 | 636 | <0.4 | 352 |
| Day 4 | 4.8 | 3893 | 724 | <0.4 | 0 |
| Day 5 | 9.5 | 3599 | 658 | <0.4 | 404 |
| Day 6 | 9.9 | 3744 | 648 | <0.4 | 469 |
| Day 7 | 10 | 3670 | 672 | <0.4 | 215 |
| Day 8 | 5.1 | 3694 | 698 | <0.4 | 176 |
| Day 9 | 5.4 | 3619 | 718 | <0.4 | 176 |
| Day 10 | 5.1 | 3522 | 682 | <0.4 | 475 |
| Day 11 | 4.7 | 3647 | 738 | 0.6 | 78 |
| Day 12 | 5.1 | 3349 | 754 | <0.4 | 234 |
| Day 13 | 5.3 | 3619 | 764 | <0.4 | 0 |
| Day 14 | 5.1 | 3990 | 744 | <0.4 | 202 |
| Day 15 | 5.2 | 2634 | 718 | <0.4 | 13 |
| Day 16 | 3.7 | 3775 | 708 | <0.4 | 208 |
| Day 17 | 5.9 | 3863 | 748 | <0.4 | 241 |
| Day 18 | 3.9 | 3823 | 730 | <0.4 | 195 |
| Day 19 | 5.8 | 3026 | 760 | <0.4 | 0 |
| Day 20 | 5.6 | 3864 | 698 | <0.4 | 371 |
| Day 21 | 5.7 | 3913 | 716 | <0.4 | 514 |
| Day 22 | 5.2 | 4088 | 756 | <0.4 | 91 |
| Average | 6.4 ± 2.2 | 3760 ± 320 | 700 ± 40 | | 210 ± 150 |

Four influent and effluent samples from the aerobic reactor were analyzed for direct determination of TMAH concentration. As shown in Table 7 below, approximately 99% of the TMAH was biodegraded, and effluent samples showed TMAH concentrations at less than 0.5 mg/liter.

TABLE 5

Operational Parameters at 1:6 Dilution

| | LOW stream | | | | TMAH stream | | |
|---|---|---|---|---|---|---|---|
| | Pre-Anoxic | Aerobic | Aerobic | AOP | Post-Anoxic | Aerobic | AOP | Post-Anoxic |
| pH | 7 ± 0.2 | 7 ± 0.2 | 7 ± 0.2 | — | 7 ± 0.2 | 7 ± 0.2 | — | 7 ± 0.2 |
| Temp. (° F.) | 70 ± 5 | 70 ± 5 | 70 ± 5 | | 70 ± 5 | 70 ± 5 | | 70 ± 5 |
| DO (mg/L) | <0.2 | >4.0 | >4.0 | | <0.2 | >4.0 | | <0.2 |
| HRT (d) | 0.16 | 0.83 | 0.83 | | 0.08 | 5.38 | | 0.79 |
| ORP (mV) | 200 ± 50 | — | — | | 200 ± 50 | — | | 200 ± 50 |
| MLSS (mg/L) | 7000 | 7000 | 7000 | | 7000 | 7000 | | 7000 |
| $Q_{recycle}$ | 3 × $Q_{inf}$ | | 3 × $Q_{inf}$ | | 1 × $Q_{inf}$ | 3 × $Q_{inf}$ | | 1 × $Q_{inf}$ |

TABLE 7

Influent and Effluent TMAH Concentrations in the Aerobic Reactor

| Date | Influent TMAH Concentration (mg/L) | Effluent TMAH Concentration (mg/L) |
|---|---|---|
| Day 1 | 4,000 | 39 |
| Day 5 | 4,100 | <0.5 |
| Day 6 | Not available | <0.5 |
| Day 7 | 3,700 | <0.5 |

The aerobic reactor used in the systems and methods in accordance with some embodiments of the present invention was fed with wastewater at a 1:6 dilution with the concentrations set forth below in Table 8. Note that such concentrations were exemplary and non-limiting, and the systems and methods of the present invention apply to various concentrations.

TABLE 8

Influent and Effluent Parameters of the Aerobic Reactor
Aerobic Reactor

| Parameters | Influent (mg/L) | Effluent (mg/L) | Removal/Conversion (%) |
|---|---|---|---|
| TOC | 2800 ± 120 | 80 ± 25 | 97% |
| TKN | 750 ± 30 | 675 ± 70 | 10% |
| $NH_4$—N | 7 ± 1 | 635 ± 60 | n/a |
| Organic-N | 740 ± 30 | 40 ± 60 | 95% |
| $NO_3$—N | <0.4 | <0.4 | n/a |
| TN | 750 ± 30 | 675 ± 40 | 10% |

The aerobic reactor effluent characteristics of 80+/−20 mg/L TOC, 635+/−60 mg/L $NH_4$—N and 675+/−70 mg/L TKN may indicate robustness of the biological system to treating TMAH. Direct measurement of the TMAH concentration also confirmed a breakdown of greater than 99% of TMHA. Note that the effluent $NH_4$—N concentration of 635+/−60 mg/L may be generated from the bio-degradation of TMAH. The nitrogen present in the TMAH molecule is organic nitrogen and not free ammonia as shown in the influent analysis of the feed wastewater. Moreover, an effluent TOC of 80+/−20 mg/L resulting in approximately 96.5% degradation in organic carbon may be an indication of TMAH bio-degradation in the aerobic reactor.

Figure 6:
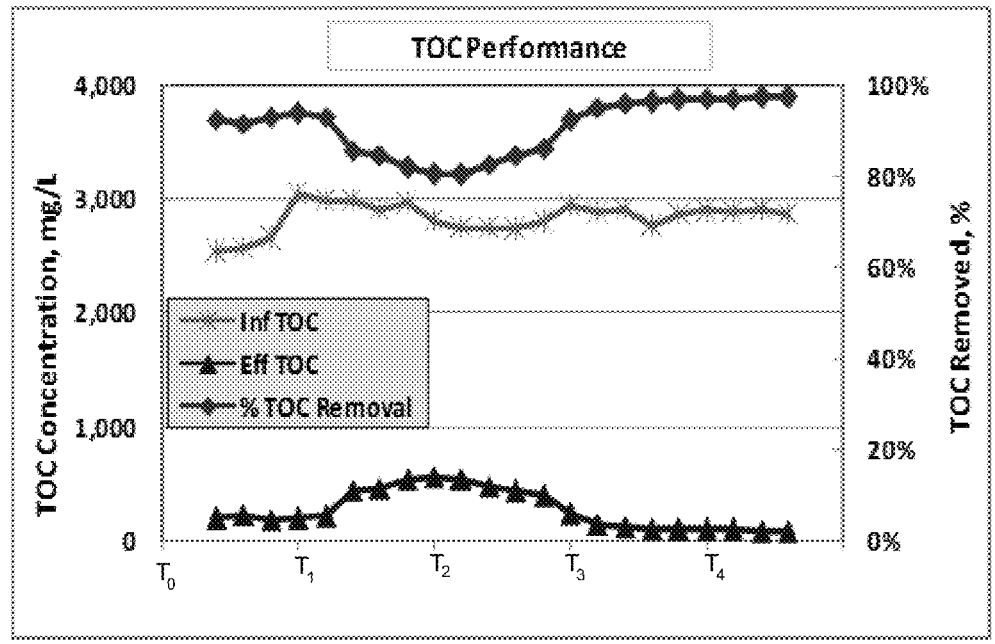
FIG. 6 illustrates an exemplary TOC removal performance in an aerobic reactor, in accordance with some embodiments of the present invention.
Figure 7:
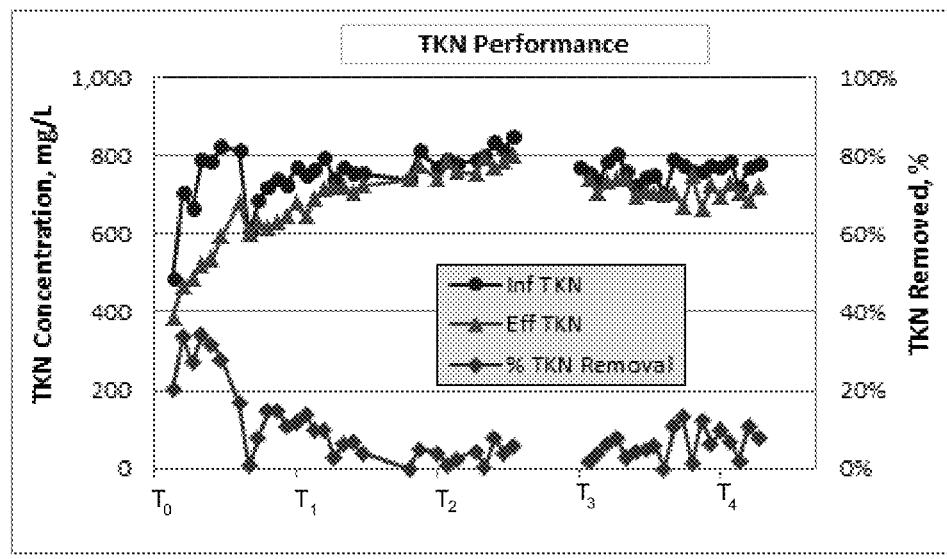
FIG. 7 illustrates an exemplary TKN removal performance in an aerobic reactor, in accordance with some embodiments of the present invention.
Figure 8:
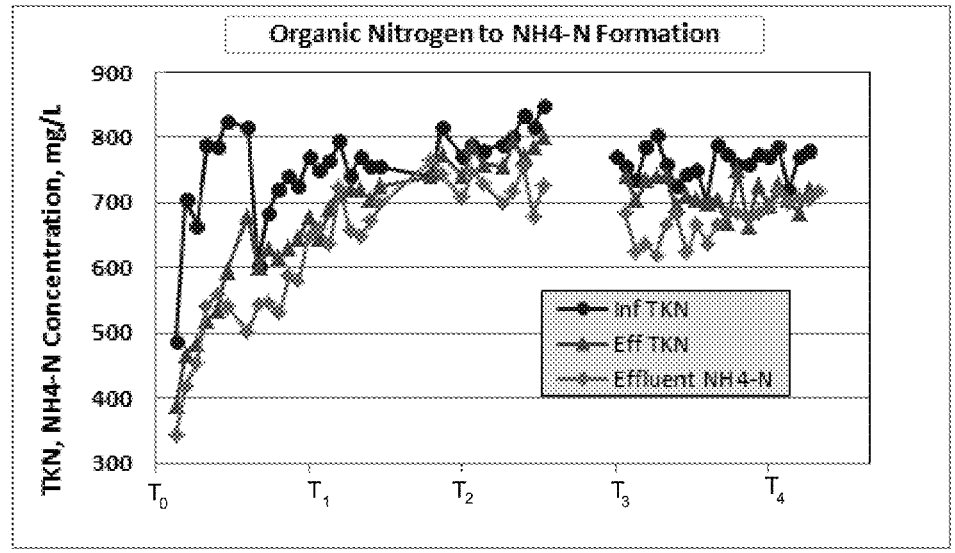
FIG. 8 illustrates an exemplary rate of ammonia ($NH_4$—N) formation during TMAH bio-degradation, in accordance with some embodiments of the present invention.

With reference to FIGS. 6 and 7, the TOC and TKN removal efficiencies in the aerobic reactor are depicted. Approximately 10% of the TKN was removed in the aerobic reactor primarily for biomass synthesis. Furthermore, FIG. 8 indicates that the biodegradation of TMAH in the aerobic reactor may generate an $NH_4$—N concentration of greater than 600 mg/L (85% of the influent TKN), which may be removed using the AOP or ammonium stripping technologies. Accordingly, greater than 95% of total nitrogen may be removed from the wastewater utilizing the treatment system in accordance with the present invention.

AOP Operating Conditions and Performance

Samples were analyzed to determine the characteristics of the feed to the AOP, as well as the AOP treated wastewater characteristics. Tables 9 and 10 below set out the results.

TABLE 9

Composite Biological and AOP Treated Effluent Characteristics

| | Bio-Effluent | | | AOP Effluent | | |
|---|---|---|---|---|---|---|
| | $NH_4$—N (mg/L) | $NO_3$—N (mg/L) | TKN (mg/L) | $NH_4$—N (mg/L) | $NO_3$—N (mg/L) | TKN (mg/L) |
| Batch 1 | 475 | <0.4 | 500 | 0.5 | 430 | Not measured |
| Batch 2 | 530 | <0.4 | 640 | 31 | 395 | Not measured |
| Batch 3 | 600 | <0.4 | 625 | 10 | 385 | Not measured |
| Batch 4 | 670 | <0.4 | 710 | 0.5 | 595 | Not measured |
| Batch 5 | 730 | <0.4 | 755 | 10 | 640 | Not measured |

TABLE 10

Influent and Effluent Characteristics of AOP Treatment
AOP Treatment

| Parameters | Influent (mg/L) | Effluent (mg/L) |
|---|---|---|
| COD | 250 ± 50 | 90 ± 30 |
| $NH_4$—N | 635 ± 60 | 12 ± 10 |
| $NO_3$—N | <0.4 | 490 ± 100 |
| TN | 675 ± 70 | Not measured |

The results shown above in Tables 9 and 10 were the result of ozonation/$H_2O_2$ treatment, in order to convert $NH_4$—N into $NO_3$—N. The AOP treatment substantially completely nitrified the ammonia in the biologically treated wastewater into nitrates. FIGS. 9-12 illustrate that the substantially complete oxidation of ammonia with ozone caused the formation of more than 400 mg/liter of nitrates. Furthermore, the AOP provided an additional reduction in the residual carbon in the wastewater by converting such carbon into carbon dioxide ($CO_2$)

Figure 9:
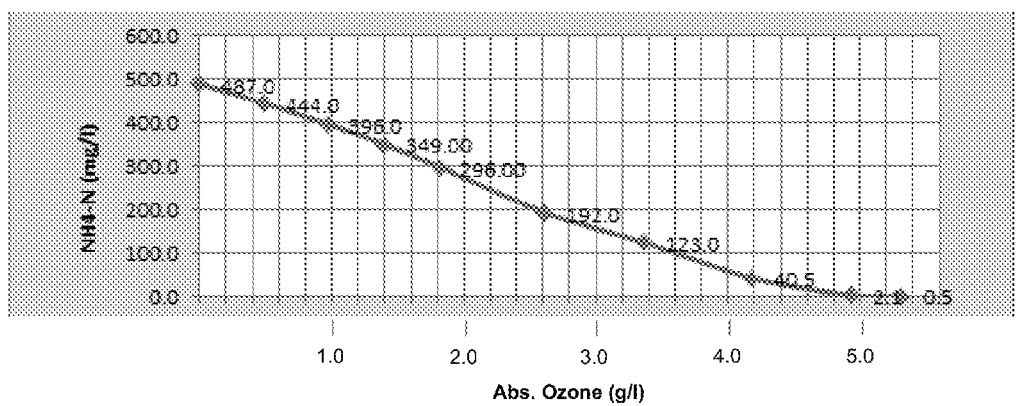
FIG. 9 illustrates an exemplary ozone demand during advanced oxidation process (AOP) oxidation of ammonia ($NH_4$—H) to nitrates ($NO_3$—N), in accordance with some embodiments of the present invention.

FIG. 9 illustrates the ozone demand during AOP oxidation of the ammonia ($NH_3$—N) in the wastewater into nitrates ($NO_3$—N). It can be seen from FIG. 9 that as the ozone level increases, the ammonia levels decrease, as it is converted into nitrates.

Figure 10:
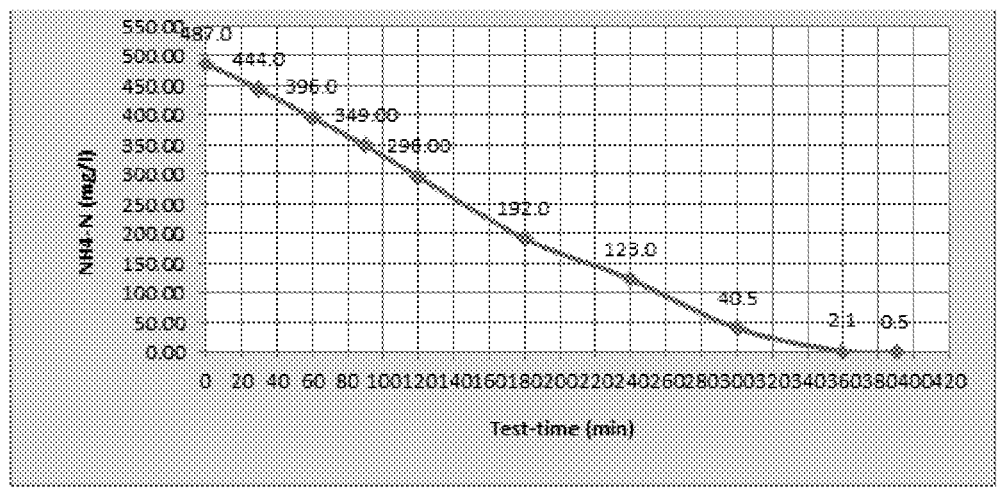
FIG. 10 illustrates an exemplary decrease of ammonia ($NH_4$—N) during AOP oxidation to nitrates ($NO_3$—N), in accordance with some embodiments of the present invention.

FIG. 10 sets forth the decrease of ammonia during the AOP oxidation into nitrates. It can be seen that as the exemplary test was conducted, the level of ammonia decreased from 487.0 mg/liters to 0.5 mg/liters in approximately 390 minutes.

Figure 11:
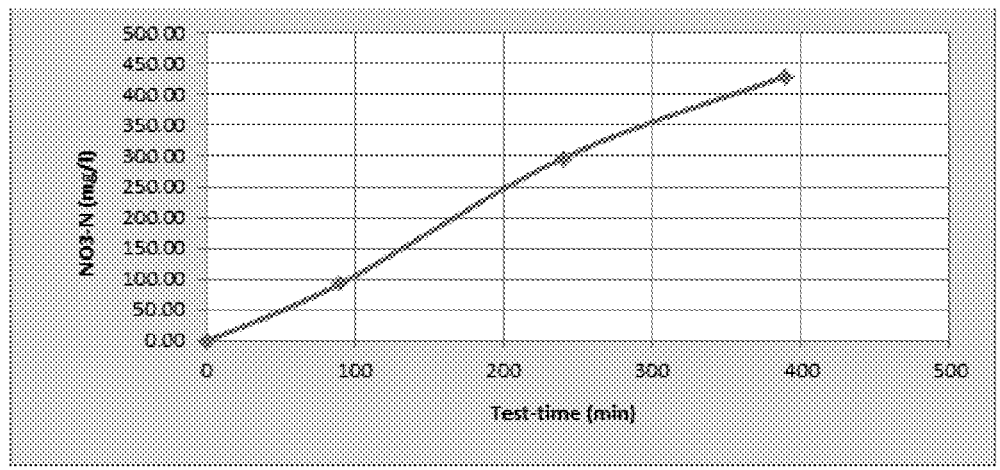
FIG. 11 illustrates an exemplary reaction time for nitrate ($NO_3$—N) formation from AOP oxidation of ammonia ($NH_4$—H), in accordance with some embodiments of the present invention.

FIG. 11 illustrates the reaction time for nitrates ($NO_3$—N) to form from the AOP oxidation of ammonia ($NH_4$—N). At approximately 390 minutes into the test, approximately 425 mg/liter of nitrates are formed.

Figure 12:
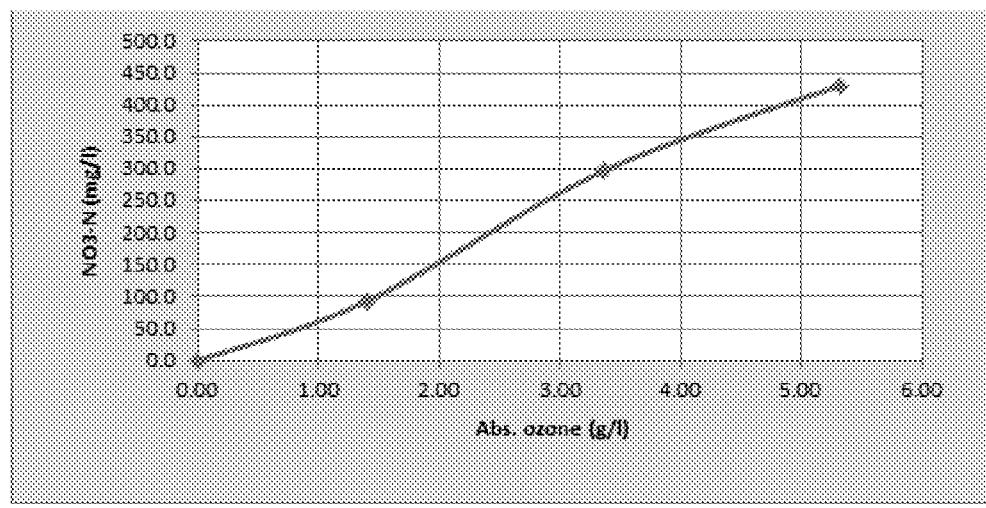
FIG. 12 illustrates an exemplary nitrate ($NH_4$—N) formation as a function of ozone demand during oxidation of ammonia ($NH_4$—H), in accordance with some embodiments of the present invention.

FIG. 12 depicts the nitrate ($NO_3$—N) formation as a function of ozone demand during oxidation of ammonia ($NH_4$—N).

Figure 13:
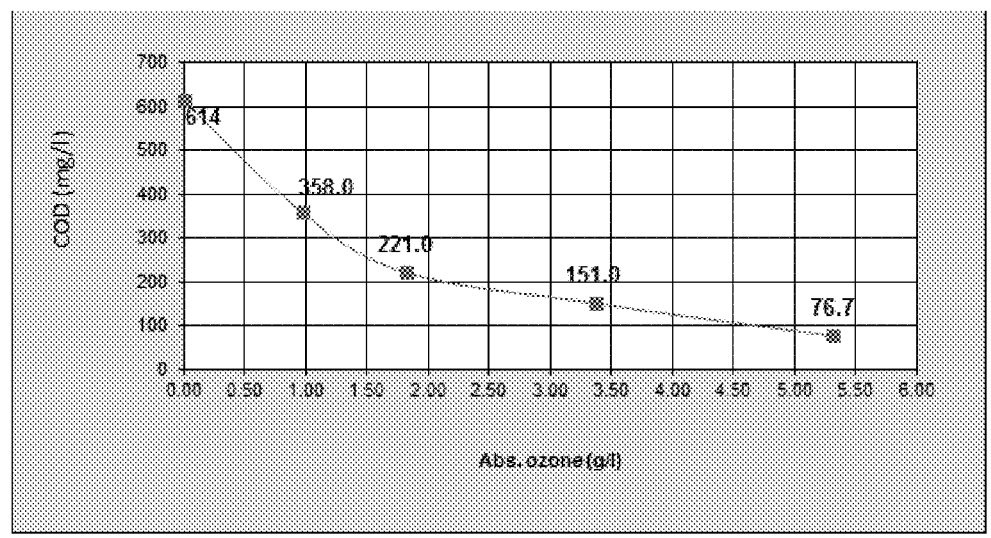
FIG. 13 illustrates an exemplary results showing reduction of chemical oxygen demand (COD) during ozonation of ammonia ($NH_4$—H).
Figure 14:
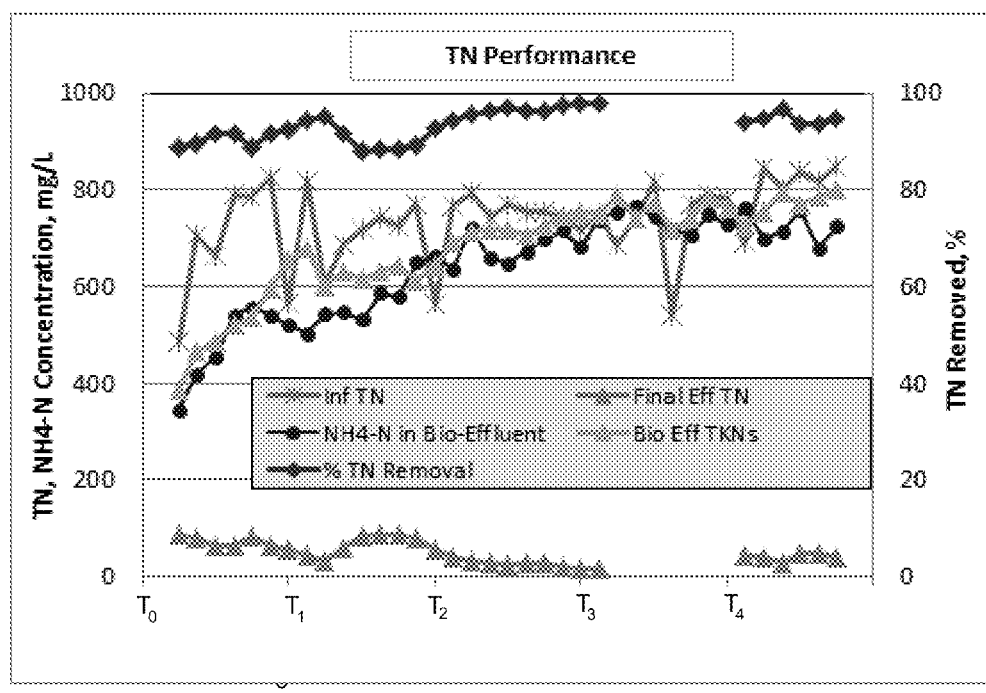
FIG. 14 illustrates an exemplary overall total nitrogen system performance, for systems in accordance with some embodiments of the present invention.

FIG. 13 shows the destruction of COD during ozonation of the ammonia in the wastewater.

Post-Anoxic Denitrification Reactor Performance

The post-anoxic denitrification reactor was fed with an influent comprising greater than 400 mg/liter nitrates ($NO_3$—N), received from the AOP reactor, as well as a carbon source (element 503 in FIG. 5). Exemplary operational parameters of the post-anoxic reactor comprise a flow of approximately 5.04 liters/day, a reactor size of 4 liters, a hydraulic residence time of 0.79 days, an operating temperature of 62-73 degrees Fahrenheit, a mixed liquor volatile suspended solids (MLVSS) of approximately 5,483 mg/liter, and a mixed liquor suspended solids (MLSS) of approximately 6,113 mg/liter.

Table 11 below illustrates the performance of the post-anoxic reactor with regard to nitrogen removal. The post-anoxic reactor effluent was measured at a $NO_3$—N amount of less than 0.4 mg/liter, thereby indicating complete biological denitrification of the nitrates.

TABLE 11

Influent and Effluent Characteristics of Denitrification Post-anoxic Reactor

| Parameters | Influent (mg/L) | Effluent (mg/L) |
|---|---|---|
| $NH_4$—N | 12 ± 10 | 10 ± 8 |
| $NO_3$—N | 490 ± 100 | <0.4 |
| $NO_2$—N | <0.5 | <0.5 |
| TKN | 40 ± 20 | 25 ± 10 |

Overall System Performance

The combination of the aerobic treatment followed by the AOP and biological denitrification increased the overall removal efficiency of the TN from the wastewater. Table 12 below indicates the removal efficiencies of the system. Specifically, aerobic biological treatment resulted in an approximate 96.5% destruction of TOC, which thereby generated a free $NH_4$—N for further conversion. The AOP ozonation of the biologically treated wastewater resulted in a substantially complete conversion of ammonia into nitrates. The post-anoxic biological denitrification provided to the AOP treated effluent resulted in substantially complete conversion of nitrates into nitrogen gas.

Treatment of LOW Stream

Figure 15:
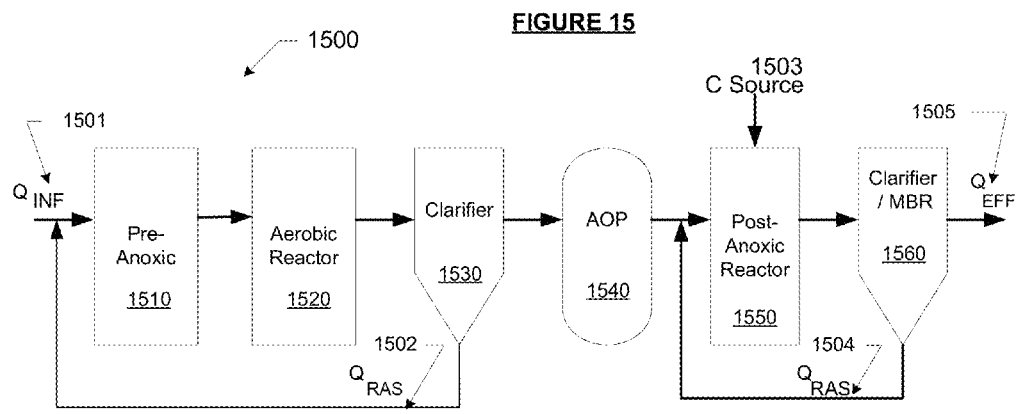
FIG. 15 depicts a system for treating liquid organic wastes, in accordance with some embodiments of the present invention.

As noted above, the LOW stream was treated with an anoxic-aerobic-AOP-anoxic process. With reference to FIG. 15 a system 1500 in accordance with some embodiments of the present invention will now be discussed. System 1500 may comprise, in general, a pre-anoxic reactor 1510, an aerobic reactor 1520, a first clarifier/MBR 1530, an AOP 1540, a post-anoxic reactor 1550, and a second clarifier/MBR 1560. An influent ($Q_{INF}$) 1501 may be provided to the pre-anoxic reactor 1510, and may subsequently be provided, in serial, to each of the aerobic reactor 1520, first clarifier/MBR 1530, AOP 1540, post-anoxic reactor 1550, and second clarifier/MBR 1560.

The first clarifier/MBR 1530 may return at least a portion of activated sludge from the first clarifier/MBR 1530 as an input of the pre-anoxic reactor 1510. It is also contemplated that the first clarifier/MBR 1530 may return at least a portion of the activated sludge to the aerobic reactor 1520. Similarly, the second clarifier/MBR 1560 may return at least a portion of activated sludge from the second clarifier/MBR 1560 as an input to the post-anoxic reactor 1550.

The operation of the various biologic reactors may be much the same as discussed above with regard to the TMAH waste stream. Similarly, the post-anoxic reactor 1550 may receive a carbon source 1503, much as discussed above.

TABLE 12

Overall System Performance

| | Influent | Aerobic | AOP | Anoxic | Effluent | Removal |
|---|---|---|---|---|---|---|
| TOC (mg/L) | 2800 ± 120 | 80 ± 20 | — | — | — | >98% |
| $NH_4$—N (mg/L) | 7 ± 1 | 690 ± 30 | 8 ± 2 | — | 6 ± 3 | — |
| $NO_3$—N (mg/L) | <0.4 | <0.4 | 610 ± 30 | <0.4 | <0.4 | — |
| $NO_2$—N (mg/L) | <0.5 | <0.5 | <0.5 | <0.5 | <0.5 | — |
| TKN (mg/L) | 750 ± 30 | 715 ± 25 | 30 ± 5 | — | 26 ± 5 | >95% |
| TMAH (mg/L) | 4000 | — | — | — | — | >99% |

The overall treatment system performance results are indicated below in Table 13.

TABLE 13

Overall Treatment System Performance Results (LOW Stream)

| | Influent | Anoxic | Aerobic | AOP | Anoxic | Effluent | Removal |
|---|---|---|---|---|---|---|---|
| COD (mg/L) | 2600 ± 125 | 920 ± 190 | 190 ± 30 | <30 | — | — | >98% |
| TOC (mg/L) | 1300 ± 90 | 450 ± 200 | 75 ± 30 | <30 | — | — | >98% |
| $NH_4$—N (mg/L) | 14 ± 4 | 55 ± 20 | 95 ± 20 | <1.0 | — | 3 ± 1 | — |
| $NO_3$—N (mg/L) | <0.4 | <0.4 | <0.4 | 95 ± 30 | <0.4 | <0.4 | — |
| $NO_2$—N (mg/L) | <0.5 | <0.5 | <0.5 | <0.5 | <0.5 | <0.5 | — |
| TKN (mg/L) | 165 ± 10 | 140 ± 15 | 120 ± 15 | 30 ± 12 | — | 25 ± 7 | >80% |
| TMAH (mg/L) | 830 | — | — | — | — | — | — |

The organic rich TMAH loaded wastewater (LOW stream) was diluted at 1:60 with distilled (DI) water to avoid potential toxicity primarily due to the presence of 49,300 mg/L of TMAH. Table 14 below shows influent, anoxic reactor, aerobic reactor and final effluent characteristics.

TABLE 14

Influent and Effluent Parameters of the Anoxic-Aerobic Reactor (LOW stream)
Anoxic-Aerobic Reactor

| Parameters | Influent (mg/L) | Effluent (mg/L) | Removal/Conversion (%) |
|---|---|---|---|
| COD | 2600 ± 125 | 90 ± 30 | 91% |
| TOC | 1300 ± 90 | 75 ± 30 | 94% |
| TKN | 165 ± 10 | 120 ± 15 | 18% |
| $NH_4$—N | 14 ± 4 | 95 ± 20 | |
| Organic-N | 150 | 50 ± 20 | 67% |
| $NO_3$—N | <0.4 | <0.4 | |
| TN | 165 ± 10 | 120 ± 15 | 18% |

$NH_4^-$N of 55 mg/L and 95 mg/L were observed in both the anoxic and aerobic reactors, respectively, at C/N ratios of 5-7 in the anoxic reactor and 1-2 in the aerobic reactor. Accordingly, the findings indicate an efficient $NH_4^{-N}$ release from the organic matrix in the aerobic reactor.

Following treatment by the aerobic reactor 1520, a clarifier/MBR 1530 may be used. Note that as discussed above, the clarifier/MBR 1530 may take one of a variety of forms (a gravity clarifier, a membrane bioreactor, or an ultrafiltration membrane).

Figure 16:
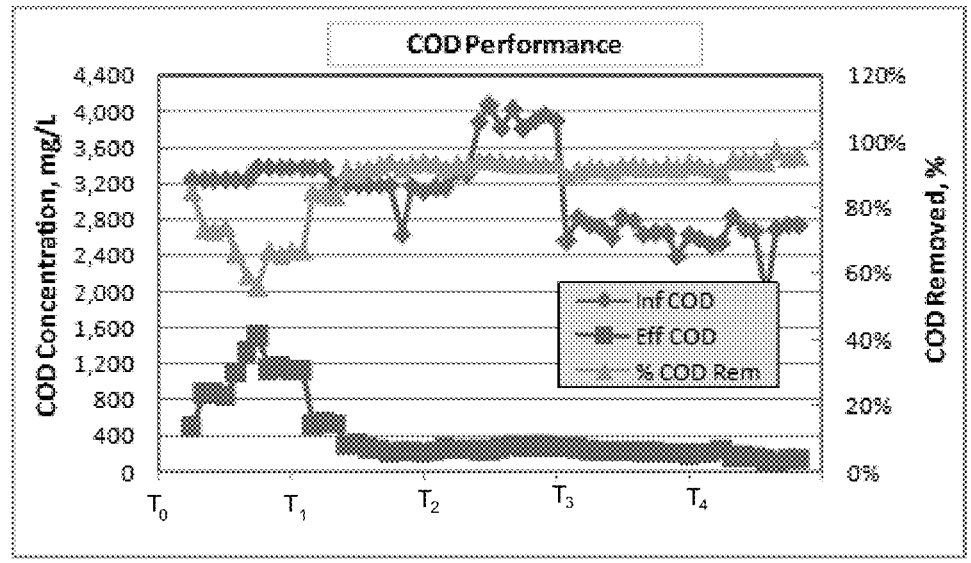
FIG. 16 illustrates results of COD performance, in accordance with some embodiments of the present invention.
Figure 17:
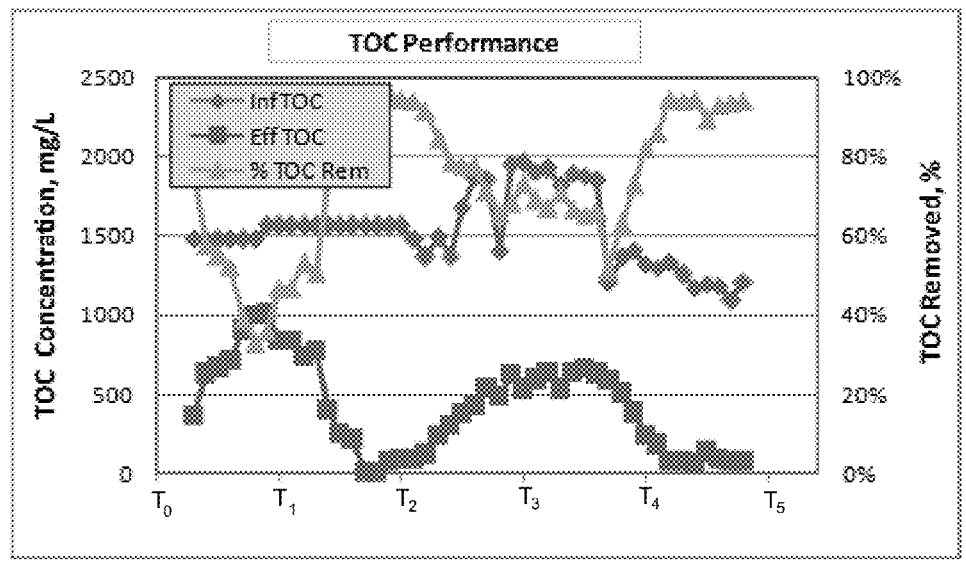
FIG. 17 illustrates results of TOC performance, in accordance with some embodiments of the present invention.
Figure 18:
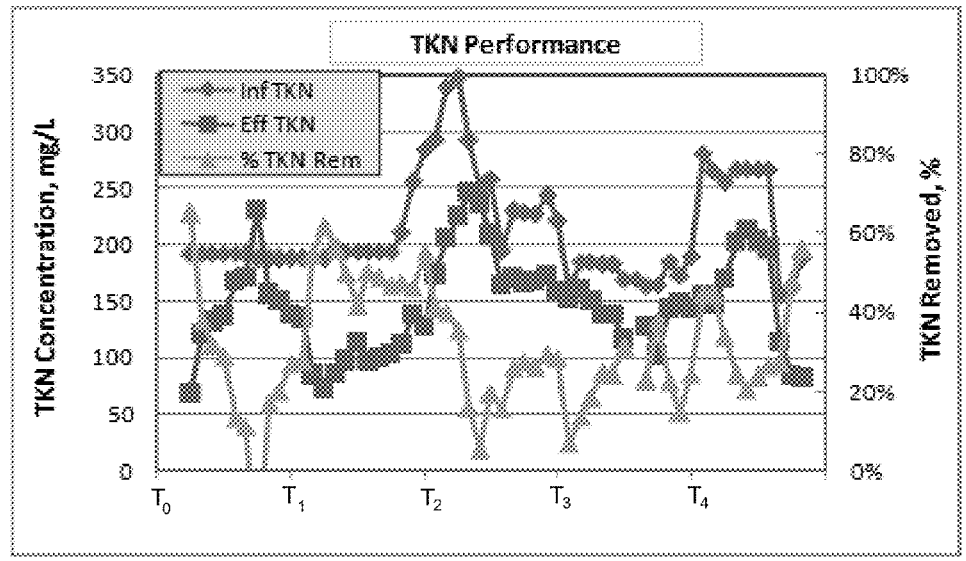
FIG. 18 illustrates results of TKN performance, in accordance with some embodiments of the present invention.

FIGS. 16, 17, and 18 illustrate, in accordance with some embodiments of the present invention, that the anoxic-aerobic-aerobic/AOP-anoxic unit consistently removed greater than 90% COD, greater than 90% TOC, and greater than 90% TMAH. Approximately 25% TN removal in the anoxic-aerobic system was primarily attributed to biomass synthesis during degradation of LOW. Effluent $NH_4^-$N (which appears to account for more than 75% of the effluent TKNs) was removed by employing nitrification-denitrification techniques. Both biological oxidation (aerobic) and chemical oxidation (ozonation, AOP) were investigated to oxidize ammonia present in the anoxic-aerobic effluent.

The anoxic-aerobic system coupled with an extended aerobic reactor resulted effluent of $NO_3$—N at less than 0.4 and $NO_2$—N at less than 0.5 which confirmed the inhibition of biological nitrification in the aerobic reactor even at a C/N ratio of less than 1.0.

Given the ineffectiveness of biological nitrification of the semiconductor wastewater, chemical oxidation (AOP) was employed to oxidize the $NH_4^-$N released from TMAH. The AOP system utilized an external carbon source (such as, for example, Micro-C4200), which was injected in the post-anoxic reactor for denitrification. Addition of AOP and post-anoxic system followed by anoxic-aerobic process improved nitrogen removal efficiency from 25% to greater than 80%.

Table 15 below sets forth the influent and effluent characteristics of the AOP treatment of the LOW stream.

TABLE 15

Influent and effluent characteristics of AOP Treatment (LOW Stream)
AOP Treatment

| Parameters | Influent (mg/L) | Effluent (mg/L) |
|---|---|---|
| COD | 190 ± 30 | <30 |
| $NH_4$—N | 95 ± 20 | <1.0 |

TABLE 15-continued

Influent and effluent characteristics of AOP Treatment (LOW Stream)
AOP Treatment

| Parameters | Influent (mg/L) | Effluent (mg/L) |
|---|---|---|
| $NO_3$—N | <0.4 | 95 ± 30 |
| TN | 120 ± 15 | not measured |

Note that as discussed above, the AOP 1540 provides oxidation of the ammonia, thereby degrading the ammonia ($NH_4^-$N) to nitrates ($NO_3^-$N). While advanced oxidation processes are discussed, it is fully contemplated by the present invention that alternatives processes may be utilized. For example, ammonia stripping, which is relatively known in the art may be utilized. Ammonia stripping may include the addition of dilute sulfuric acid in order to recover the ammonia as ammonium sulfate, a well-known fertilizer. Other alternatives may include breakpoint chlorination, a catalytic oxidation method, and/or selective ion exchange on clinoptilolite. Regardless of the specific system selected, the primary contribution of the system is the degradation of ammonia to nitrates.

As noted above, after treatment by the AOP system 1540, the fluid is fed to the post-anoxic reactor 1550 for denitrification, to degrade the nitrates to nitrogen gas. More specifically:

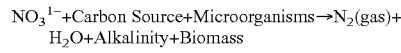

$NO_3^{1-}$+Carbon Source+Microorganisms→$N_2$(gas)+ $H_2O$+Alkalinity+Biomass

As wastewater may be deficient in macronutrients required to support biological growth, the post-anoxic reactor 1550 may be fed with a carbon source 1503. The carbon source may comprise a biodegradable nutrient blend, containing macro- and micronutrients to maintain microbial growth. As noted above, nutrients may include but are not limited to supplemental carbon such as waste sugar, corn syrup, molasses or the like, urea or the use of commercially available carbon sources, such as MicroC (available from Environmental Operating Solutions, Inc., in Bourne, Mass.) or D-Glucose (dextrose).

TABLE 16

Influent and Effluent Characteristics of De-Nitrification (LOW Stream)
Post-anoxic Reactor

| Parameters | Influent (mg/L) | Effluent (mg/L) |
|---|---|---|
| $NH_4$—N | <1.0 | 3 ± 1 |
| $NO_3$—N | 95 ± 30 | <0.4 |
| $NO_2$—N | <0.5 | <0.5 |
| TKN | 30 ± 12 | 25 ± 7 |

Following treatment by the post-anoxic reactor 1550, a second clarifier/MBR 1560 may be used. Note that as discussed above, the clarifier/MBR 1560 may take one of a variety of forms (a gravity clarifier, a membrane bioreactor, or an ultrafiltration membrane. It is contemplated that the second clarifier/MBR 1560 may be a gravity clarifier for sludge separation.

PH Variations

It was noted during experimentation that the pH of the wastewater had an impact on the decomposition of TMAH and/or $NH_4$—N formation.

Full-Scale Treatment System

Utilizing the systems and methods of the present invention, parameters for a full-scale treatment system can be set forth. Note that the following parameters are exemplary only, and variations in the sizes, rates, coefficients, and efficiencies may vary while still being taught by the present invention.

A full-scale aerobic biological reactor may have the following exemplary characteristics: a TOC removal rate of 3.13+/−0.19 g TOC/kg MLVSS/hr; a TMAH removal rate of 4.86 g TMAH/kg MLVSS/hr; a TKN assimilation rate of 0.1613+/−0.12 g TKN-N/kg MLVSS/hr; and a TKN or TMAH conversion rate to free ammonia of 0.8123+/−0.089 g TKN-N/kg MLVSS/hr. Additional characteristics (such as biomass yield coefficient or chemicals consumption rates) may also be provided.

A full-scale AOP treatment system may have characteristics such as an influent $NH_4$—N of approximately 600 mg/liter (0.6 g/liter), an effluent $NH_4$—N of less than 2 mg/liter, and a flow rate of 180 gpm (682 liters/min). Ozone amounts may vary: at $NH_4$—N of 2 mg/liter, the ratio of $O_3$ to $NH_4$—N may be approximately 10.2, yielding 250.4 kg/h $O_3$. However, in order to allow for some off gas, a full scale design of approximately 270 kg/$O_3$/hr may be desired.

In addition, the AOP treatment system may comprise an oxidation tank, which may allow for recirculation for more than 60 minutes. Accordingly, the working volume can be up to two (2) times the expected hourly flow of 10,800 gallons. Ozone may then be applied for more than 60 minutes if needed, or can be applied for less than 60 minutes if the oxidation is complete. A TOC/TN analyzer may provide a determination when the oxidation is complete.

A full-scale post-anoxic biological denitrification reactor may have exemplary characteristics such as a nitrate conversion rate of 0.828+/−0.0098 kg/$NO_3$—N/kg MLVSS/day; and a chemicals consumption rate of 6 mg COD/mg $NO_3$—N of carbon source.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A biological and chemical treatment system for treating wastewater comprising liquid organic wastes and toxic chemicals generated from the production of thin film transistor liquid crystal displays, the wastewater comprising tetramethyl ammonium hydroxide (($CH_3$)$_4$NOH, "TMAH"), the system comprising:
   an aerobic reactor, receiving an influent comprising wastewater to be treated, configured to cause the degradation of at least 90% of the TMAH in the influent to $NH_4$—N ("ammonia");
   a first separation module in series with the aerobic reactor, the first separation module receiving the output of the aerobic reactor as an input, the first separation module separating liquid and solid components of the wastewater;
   an oxidation module in series with the first separation module, the oxidation module receiving the output of the first separation module as an input, the oxidation module nitrifying any free ammonia and removing organic materials from the wastewater using an advanced oxidation process system that utilizes inputs of ozone ($O_3$) and hydrogen peroxide ($H_2O_2$) to oxidize the wastewater received from the first separation module; and
   a post-anoxic reactor in series with the oxidation module, the post-anoxic reactor receiving the output of the oxidation module as an input, the post-anoxic reactor denitrifying at least a portion of the wastewater, and outputting an effluent;
   wherein the effluent has a reduction of total organic carbon ("TOC") and total nitrogen ("TN") of more of more than 90% compared with the influent.

2. The system of claim 1, wherein the first separation module is a clarifier, in which sedimentation of sludge occurs.

3. The system of claim 1, wherein the first separation module is a membrane bioreactor that utilizes microfiltration or ultrafiltration membranes to separate the liquid and solid components.

4. The system of claim 1, wherein the first separation module outputs activated sludge, and wherein the influent further comprises activated sludge from the first separation module.

5. The system of claim 1, wherein the oxidation module comprises an ammonia stripper.

6. The system of claim 1, further comprising:
   a second separation module in series with the post-anoxic reactor, the second separation module receiving the output of the post-anoxic reactor as an input, the second separation module separating liquid and solid components of the wastewater.

7. The system of claim 6, wherein the second separation module is a clarifier, in which sedimentation of sludge occurs.

8. The system of claim 6, wherein the second separation module is a membrane bioreactor that utilizes microfiltration or ultrafiltration membranes to separate the liquid and solid components.

9. The system of claim 6, wherein the second separation module outputs activated sludge, and wherein at least a portion of the activated sludge from the second separation module is provided as an input to the post-anoxic reactor.

10. The system of claim 1, wherein the input to the oxidation module comprises ammonia, and wherein the oxidation module causes the oxidation of at least some of the ammonia to $NO_3$—N ("nitrates").

11. The system of claim 10, wherein the oxidation module causes a substantially complete oxidation of the ammonia to nitrates.

12. The system of claim 10, wherein the input to the post-anoxic reactor comprises nitrates, and wherein the post-anoxic reactor causes the degradation of at least some of the nitrates to $N_2$ ("nitrogen gas") and $H_2O$ ("water").

13. The system of claim 12, wherein the post-anoxic reactor causes a substantially complete degradation of nitrates to nitrogen gas and water.

14. The system of claim 1, wherein the effluent has a reduction in the TOC of the wastewater of more than 95%.

15. The system of claim 1, wherein the effluent has a reduction in the TN of the wastewater of more than 95%.

16. A biological and chemical treatment method for treating wastewater comprising liquid organic wastes and toxic chemicals generated from the production of thin film transistor liquid crystal displays, the wastewater comprising tetramethyl ammonium hydroxide (($CH_3$)$_4$NOH, "TMAH"), comprising:
   receiving an influent comprising wastewater to be treated in an aerobic reactor;
   biologically treating the influent to convert and degrade the any nitrogen compounds in the organic wastes, and causing more than 99% of the TMAH to degrade ammonia;

receiving at a first separation module from the aerobic reactor an output of the aerobic reactor, the first separation module comprising a membrane bioreactor that separates the liquid and solid components of the wastewater by microfiltration or ultrafiltration;

separating any solid components of the wastewater by the first separation module;

receiving at an advanced oxidation process system from the first separation module an output of the first separation module, the advanced oxidation process system removing organic materials by treating the output of the first separation module with ozone ($O_3$), and hydrogen peroxide ($H_2O_2$), the advanced oxidation process system causes a substantially complete oxidation of ammonia to $NO_3$—N ("nitrates");

removing organic materials from the wastewater by the oxidation module;

receiving at a post-anoxic reactor from the oxidation module an output of the oxidation module; and denitrifying at least a portion of the wastewater by the post-anoxic reactor, and outputting an effluent, wherein the effluent has a reduction of total organic carbon ("TOC") and total nitrogen ("TN") of more of more than 90% compared with the influent.

17. The method of claim 16, further comprising:
outputting by the first separation module activated sludge; and
adding at least a portion of the activated sludge to the influent.

18. The method of claim 16, wherein the organic materials are removed from the wastewater by ammonia stripping.

19. The method of claim 16, further comprising:
receiving at a second separation module from the post-anoxic reactor an output of the post-anoxic reactor;
separating liquid and solid components of the wastewater by the second separation module.

20. The method of claim 19, wherein the second separation module is a clarifier, in which sedimentation of sludge occurs.

21. The method of claim 19, further comprising:
outputting by the second separation module activated sludge; and
adding at least a portion of the activated sludge from the second separation module to the input of the post-anoxic reactor.

22. The method of claim 16, wherein the post-anoxic reactor receives nitrates and degrades of at least some of the nitrates to $N_2$ ("nitrogen gas") and $H_2O$ ("water").

23. The method of claim 22, wherein the post-anoxic reactor substantially completely degrades the nitrates to nitrogen gas and water.

24. The method of claim 16, causing a reduction in the TOC of the wastewater of more than 95%.

25. The method of claim 16, causing a reduction in the TN of the wastewater of more than 95%.

* * * * *